(12) United States Patent  
Takeuchi et al.

(10) Patent No.: US 11,221,533 B2  
(45) Date of Patent: Jan. 11, 2022

(54) ELECTROCHROMIC DEVICE

(71) Applicant: Ricoh Company, Ltd., Tokyo (JP)

(72) Inventors: Kohji Takeuchi, Kanagawa (JP); Tohru Yashiro, Kanagawa (JP); Takahiko Matsumoto, Kanagawa (JP); Sukchan Kim, Tokyo (JP); Shun Goto, Ibaraki (JP); Keiichiroh Yutani, Kanagawa (JP); Hidekazu Yaginuma, Kanagawa (JP); Atsushi Ohshima, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 74 days.

(21) Appl. No.: 16/006,889

(22) Filed: Jun. 13, 2018

(65) Prior Publication Data

US 2018/0299740 A1    Oct. 18, 2018

Related U.S. Application Data

(63) Continuation of application No. PCT/JP2016/086065, filed on Dec. 5, 2016.

(30) Foreign Application Priority Data

Dec. 15, 2015 (JP) .............................. JP2015-244240

(51) Int. Cl.
*G02C 1/00* (2006.01)
*G02F 1/155* (2006.01)
(Continued)

(52) U.S. Cl.
CPC .............. *G02F 1/155* (2013.01); *G02C 7/101* (2013.01); *G02F 1/13458* (2013.01);
(Continued)

(58) Field of Classification Search
CPC ........ G02C 7/101; G02C 11/10; G02C 7/102; G02C 7/083; G02C 2202/16; G02C 7/00
(Continued)

(56) References Cited

U.S. PATENT DOCUMENTS 5,353,148 A    10/1994   Eid et al.
6,388,797 B1    5/2002   Lipton et al.
(Continued)

FOREIGN PATENT DOCUMENTS

CN    104332742       2/2015
CN    104777695 A     7/2015
(Continued)

OTHER PUBLICATIONS

Extended European Search Report dated Oct. 23, 2018 in European Patent Application No. 16875449.7, 7 pages.
(Continued)

*Primary Examiner* — Hung X Dang
(74) *Attorney, Agent, or Firm* — Xsensus LLP

(57) ABSTRACT

Provided is an electrochromic device including an electrochromic element including a protrusion on a periphery of the electrochromic element, and a frame holding the electrochromic element, wherein the protrusion includes an electrode pad, and the frame includes a connecting member configured to electrically connect to the electrode pad.

10 Claims, 8 Drawing Sheets

(51) Int. Cl.
*G02C 7/10* (2006.01)
*G02F 1/153* (2006.01)
*G02F 1/1345* (2006.01)

(52) U.S. Cl.
CPC ............ *G02F 1/153* (2013.01); *G02F 1/1533* (2013.01); *G02F 2001/1536* (2013.01)

(58) Field of Classification Search
USPC ...................................... 351/44, 49, 158, 41
See application file for complete search history.

(56) References Cited

U.S. PATENT DOCUMENTS

| | | | |
|---|---|---|---|
| 9,304,368 B2* | 4/2016 | Yashiro | G02F 1/1525 |
| 2004/0057100 A1 | 3/2004 | Terada et al. | |
| 2010/0265456 A1 | 10/2010 | Matsui | |
| 2013/0107186 A1 | 5/2013 | Ando et al. | |
| 2015/0077828 A1 | 3/2015 | Kukita | |
| 2015/0168796 A1 | 6/2015 | Yashiro et al. | |
| 2015/0198857 A1 | 7/2015 | Yashiro et al. | |

FOREIGN PATENT DOCUMENTS

| | | |
|---|---|---|
| EP | 0 532 942 A1 | 3/1993 |
| JP | 61-129626 | 6/1986 |
| JP | 63-148921 | 9/1988 |
| JP | 02-138720 | 11/1990 |
| JP | 03-032069 | 2/1991 |
| JP | 08-007384 | 1/1996 |
| JP | 2003-502693 | 1/2003 |
| JP | 2013-077028 | 4/2013 |
| JP | 2014-019241 | 2/2014 |
| JP | 2015-094924 | 5/2015 |
| JP | 2015-096879 | 5/2015 |
| JP | 2015-132778 | 7/2015 |
| WO | WO 00/77559 | * 12/2000 |
| WO | WO00/077559 A1 | 12/2000 |
| WO | WO03/032069 A1 | 4/2003 |

OTHER PUBLICATIONS

International Search Report dated Feb. 14, 2017 for counterpart International Patent Application No. PCT/JP2016/086065 filed Dec. 5, 2016 ( with English Translation).

Written Opinion dated Feb. 14, 2017 for counterpart International Patent Application No. PCT/JP2016/086065 filed Dec. 5, 2016.

Office Action dated Jun. 30, 2020 in corresponding Chinese Patent Application No. 201680073424.8 (with English Translation), 9 pages.

Office Action in corresponding Chinese Application No. 201680073424.8 dated Feb. 10, 2021.

* cited by examiner

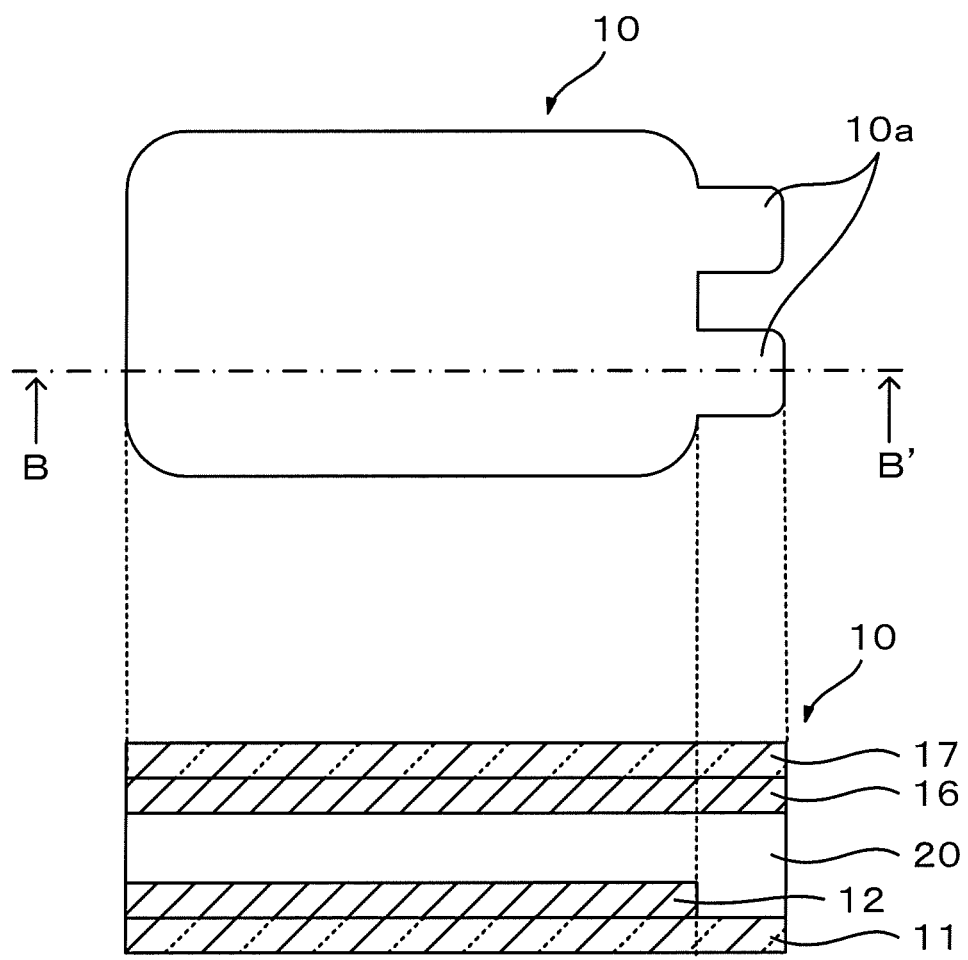

ELECTROCHROMIC DEVICE

CROSS-REFERENCE TO RELATED APPLICATIONS

The present application is a continuation application of International Application No. PCT/JP2016/086065, filed Dec. 5, 2016, which claims priority to Japanese Patent Application No. 2015-244240, filed Dec. 15, 2015. The contents of these applications are incorporated herein by reference in their entirety.

BACKGROUND OF THE INVENTION

Field of the Invention

The present disclosure relates to an electrochromic device.

Description of the Related Art

Electrochromism is a phenomenon where a redox reaction is performed to reversibly change a color by applying voltage. An electrochromic element utilizing the electrochromism has been intensively studied to realize applications derived from characteristics of the electrochromism.

Since the electrochromic element can vary light transmittance thereof according to electric signals, the electrochromic element has an advantage that a user can freely control the light transmittance. Therefore, developments have been made to realize electrochromic devices for practical use, such as light-adjusting spectacles using the electrochromic elements as lenses.

For example, proposed is an electrochromic device where an electrochromic element and a power source are electrically connected via a rim by pressure-bonding the conductive rim holding a periphery of the electrochromic element to an electrode pad exposed at an edge surface of the electrochromic element (see, for example, Japanese Unexamined Utility Model Application Publication No. 02-138720). Moreover, proposed is an electrochromic device where an electrochromic element and a power source are electrically connected with anisotropic conductive rubber nipped between an electrode pad and a rim (see, for example, Japanese Patent No. 5511997).

SUMMARY OF THE INVENTION

According to one aspect of the present disclosure, an electrochromic device includes an electrochromic element including a protrusion on a periphery of the electrochromic element, and a frame holding the electrochromic element. The protrusion includes an electrode pad and the frame includes a connecting member configured to electrically connect to the electrode pad.

BRIEF DESCRIPTION OF THE DRAWINGS

FIG. 5A is a schematic view illustrating another example of a front surface and cross-section of the electrochromic element used in the electrochromic device of FIG. 1;

DESCRIPTION OF THE EMBODIMENTS (Electrochromic Device)

Figure 1:
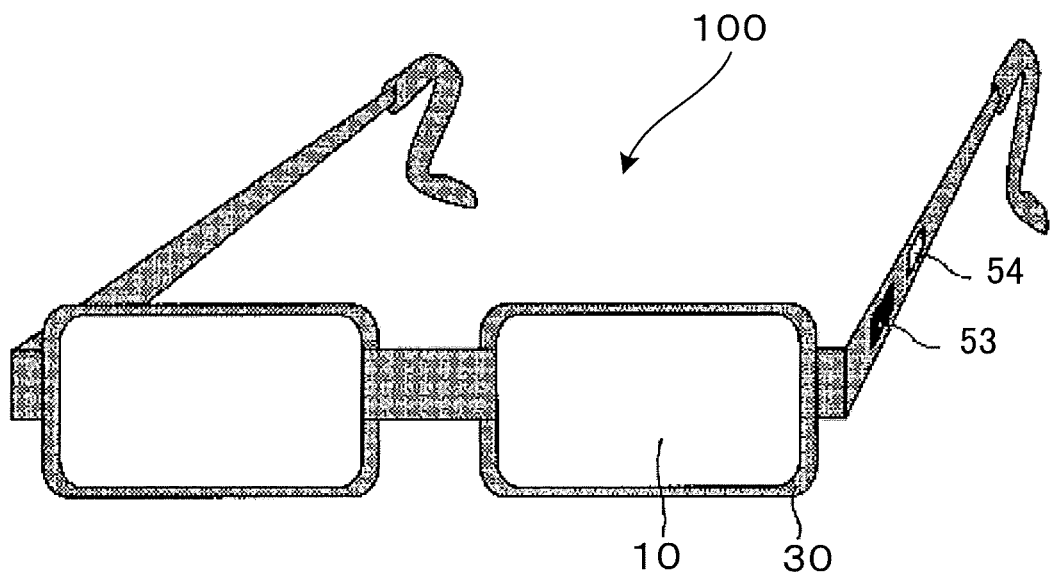
FIG. 1 is a schematic view illustrating one example of an electrochromic device of the present disclosure.

An electrochromic device of the present disclosure includes an electrochromic element including a protrusion on a periphery thereof and a frame holding the electrochromic element. The protrusion includes an electrode pad and the frame includes a connecting member configured to electrically connect to the electrode pad. The electrochromic device may further include other members according to the necessity.

The electrochromic device of the present disclosure is based on insights that it is difficult for an electrochromic device known in the art to obtain durability of electrical connection because a screw for securing the rim in contact with the electrode pad on an edge face of the electrochromic element is loosened or an area of the electrode pad is small.

The present disclosure has an object to provide an electrochromic device having excellent durability of electric connection.

The present disclosure can provide an electrochromic device having excellent durability of electric connection.

The electrochromic element includes a pair of electrode layers (a first electrode layer and second electrode layer described later) to which electric signals are applied. The electrode pad that is to be electrically connected to the electrode layer is disposed on the protrusion. The electrode pad is included for the purpose of improving durability of electrical connection between an edge of the electrode layer exposed from an edge face of the protrusion and the connecting member on the side of the frame connected to a power source. An area that can be in contact with the connecting member can be extended by the electrode pad.

Moreover, giving the protrusion a structure where the protrusion can locked with the connecting member can fix the entire electrochromic element and can obtain electrical connection having excellent durability.

Examples of use of the electrochromic device include electrochromic light-adjusting spectacles that use the electrochromic element as lenses and can adjust light transmittance depending on electric signals applied to the electrochromic element.

<Electrochromic Element>

The electrochromic element is not particularly limited and may be appropriately selected depending on the intended purpose, as long as the electrochromic element has the protrusion on a periphery thereof.

A shape of the electrochromic element is not particularly limited and may be appropriately selected depending on the intended purpose. In the case where the electrochromic device of the present disclosure is used as a pair of electrochromic light-adjusting spectacles, the electrochromic element is preferably in the shape of a lens where an outer shape of the electrochromic element corresponds to a shape of a rim of the frame.

Note that, a layer structure of the electrochromic element will be described later.

<<Protrusion>>

The protrusion is not particularly limited and may be appropriately selected depending on the intended purpose, as long as the protrusion includes the electrode pad.

The number of the protrusion(s) is not particularly limited and may be appropriately selected depending on the intended purpose. A plurality of the protrusions may be disposed. For the purpose of applying voltage between a pair of the electrodes included in the electrochromic element, the number of the protrusions may be 2.

When the number of the protrusions is 2 or more, example of an arrangement of the protrusions on the periphery of the electrochromic element include an arrangement where the protrusions are disposed to next to one another to shorten wiring of the line, and an arrangement where a plurality of the protrusions are disposed on both the sides of the electrochromic element in order to fix the electrochromic element with a mechanically desirable balance.

Examples of a shape of the protrusion include rectangular shapes and semicircle shapes.

A formation method of the protrusion is not particularly limited and may be appropriately selected depending on the intended purpose. When the electrochromic element is used as a lens, examples of the formation method of the protrusion include a method where the protrusion is formed during lens shape processing to cut to match an outer shape of the electrochromic element with a shape of a rim of the frame.

—Electrode Pad—

The electrode pads are electrically connected to a pair of the electrode layers included in the electrochromic element and are brought into contact with the connecting members disposed on the rim of the frame to electrically connect to the connecting members. Specifically, the electrode pads act as contact points for electrically connecting a power source, which is electrically connected to the connecting members, to the electrochromic elements.

As a structure of the electrode pad, the electrode pad is disposed in a manner that the electrode pad is wound around the protrusion and is preferably fixed onto the protrusion with the conductive adhesive.

A method for electrically connecting the electrode layer to the electrode pad is not particularly limited and may be appropriately selected depending on the intended purpose. The method is preferably a method where edges of a pair of the electrode layers are electrically connected to the separate electrode pads through application of a conductive adhesive.

In order to prevent short circuit between the pair of the electrode layers via the conductive adhesive, moreover, the edge face of either of the electrode layers is preferably exposed from the edge of the electrochromic element that is in the form of the laminate in the region where the conductive adhesive is applied.

Examples of the electrode pad include metal foil. Examples of the metal foil include copper foil and aluminium foil.

The conductive adhesive is not particularly limited and may be appropriately selected depending on the intended purpose. Examples of the conductive adhesive include silver paste.

<<Layer Structure of Electrochromic Element>>

A layer structure of the electrochromic element is not particularly limited and may be appropriately selected depending on the intended purpose. The layer structure is preferably a first embodiment or second embodiment described below.

First Embodiment

A layer structure of the electrochromic element according to a first embodiment includes a first substrate, a first electrode layer, an electrochromic layer, an insulating inorganic-particle layer, a second electrode layer, and a second substrate in the order as mentioned, and includes an electrolyte between the first electrode layer and the second electrode layer.

—First Substrate and Second Substrate—

The first substrate and the second substrate (may be simply referred to as a "substrate" hereinafter, when it is not necessary to identify the first substrate or the second substrate) are not particularly limited and any of resin materials that can be used for thermoforming and known in the art is appropriately selected as it is, depending on the intended purpose. Examples of the substrate include resin substrates, such as polycarbonate resins, acrylic resins, polyethylene resins, polyvinyl chloride resins, polyester resins, epoxy resins, melamine resins, phenol resins, polyurethane resins, and polyimide resins.

In order to enhance water vapor-barrier properties, gas barrier properties, and visibility, moreover, a surface of the substrate may be coated with a transparent insulating inorganic-particle layer, an antireflection layer, etc.

A shape of the substrate is not particularly limited and may be appropriately selected depending on the intended purpose. Examples of the shape include oval shapes and rectangular shapes. When the electrochromic device is used as the electrochromic light-adjusting spectacles, moreover, the first substrate is used as a lens, and an outer shape of the first substrate may be shaped to match a rim of the frame.

—First Electrode Layer and Second Electrode Layer—

A material of each of the first electrode layer and the second electrode layer (may be simply referred to as an "electrode layer" hereinafter, when it is not necessary to identify the first electrode layer or the second electrode layer) is not particularly limited and may be appropriately selected depending on the intended purpose, as long as the material is a material that is transparent and has conductivity. Examples of the material include tin-doped indium oxide (may be referred to as "ITO" hereinafter), fluorine-doped tin oxide (may be referred to as "FTO" hereinafter), and antimony-doped tin oxide (may be referred to as "ATO" hereinafter). Among the above-listed examples, the material is preferably a material including at least one selected from indium oxide (may be referred to as "In oxide" hereinafter), tin oxide (may be referred to as "Sn oxide" hereinafter), and zinc oxide (may be referred to as "Zn oxide" hereinafter) formed by vacuum film formation because the above-mentioned materials are materials that can be easily formed into a film by sputtering, as well as excellent transparency and electrical conductivity can be obtained. Among the above-listed examples, InSnO, GaZnO, SnO, $In_2O_3$, and ZnO are particularly preferable. Moreover, a transparent network electrode of silver, gold, carbon nanotubes, or metal oxide, or a composite layer of the above-listed electrodes is also effective.

An average thickness of the electrode layer is not particularly limited and may be appropriately selected depending on the intended purpose. The average thickness of the electrode layer is preferably adjusted to obtain a necessary electric resistance value for an electrochromic redox reaction. When ITO is used, the average thickness is preferably 50 nm or greater but 500 nm or less.

A formation method of the electrochromic layer is not particularly limited and may be appropriately selected depending on the intended purpose. Examples of the formation method include vacuum film formation methods and coating film formation methods.

Examples of the vacuum film formation methods include vacuum vapor deposition, sputtering, and ion plating.

Examples of the coating film formation methods include spin coating, casting, microgravure coating, gravure coating, bar coating, roll coating, wire bar coating, dip coating, slit coating, capillary coating, spray coating, nozzle coating, and various printing methods, such as gravure printing, screen printing, flexo printing, offset printing, reverse printing, and inkjet printing.

—Electrochromic Layer—

The electrochromic layer is not particularly limited and may be appropriately selected depending on the intended purpose, as long as the electrochromic layer includes an electrochromic compound.

As a material of the electrochromic compound, any of electrochromic compound materials known in the art, such as dye-based electrochromic compound materials, polymer-based electrochromic compound materials, metal complex-based electrochromic compound materials, and metal oxide-based electrochromic compound materials can be used.

Examples of the dye-based electrochromic compound and the polymer-based electrochromic compound include: low-molecular organic electrochromic compounds, such as azobenzene-based compounds, anthraquinone-based compounds, diarylethene-based compounds, dihydroprene-based compounds, dipyridine-based compounds, styryl-based compounds, styrylspiropyran-based compounds, spirooxazine-based compounds, spirothiopyran-based compounds, thioindigo-based compounds, tetrathiafulvalene-based compounds, terephthalic acid-based compounds, triphenylmethane-based compounds, triphenylamine-based compounds, naphthopyran-based compounds, viologen-based compounds, pyrazoline-based compounds, phenazine-based compounds, phenylenediamine-based compounds, phenoxazine-based compounds, phenothiazine-based compounds, phthalocyanine-based compounds, fluoran-based compounds, flugide-based compounds, benzopyran-based compounds, and metallocene-based compounds; and conductive polymer compounds, such as polypyrrole, polyaniline, and polythiophene. The above-listed examples may be used alone or in combination. Among the above-listed examples, viologen-based compounds (see, for example, Japanese Patent No. 3955641 and Japanese Unexamined Patent Application Publication No. 2007-171781) and dipyridine-based compounds (see, for example, Japanese Unexamined Patent Application Publication No. 2007-171781 and Japanese Unexamined Patent Application Publication No. 2008-116718) are preferable. Among the above-listed preferable examples, the viologen-based compounds or the dipyridine-based compounds are preferable because the electrochromic compound can exhibit an excellent color value at the time of coloring and decoloring even when voltage applied between a display electrode and a counter electrode is low, and the dipyridine-based compounds represented by General Formula 1 below are more preferable because a color value of excellent coloring is exhibited.

[General Formula 1]

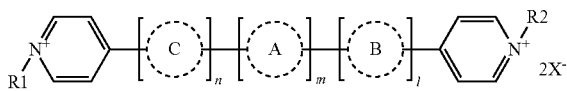

In General Formula 1 above, R1 and R2 are each independently an alkyl group having from 1 through 8 carbon atoms or an aryl group both of which may have a substituent, where at least one of R1 and R2 includes a substituent selected from COOH, $PO(OH)_2$, and $Si(OC_kH_{2k+1})_3$ (with the proviso that k is from 1 through 20). $X^-$ is a monovalent anion. $X^-$ is not particularly limited as long as $X^-$ can stably form a pair with a cation, and examples of $X^-$ include a Br ion ($Br^-$), a Cl ion ($Cl^-$), a $ClO_4$ ion ($ClO_4^-$), a $PF_6$ ion ($PF_6^-$), and $BF_4$ ion ($BF_4^-$). n, m, and l are 0, 1, or 2. A, B, and C are each independently an alkylene group having from 1 through 20 carbon atoms, an arylene group, or a divalent heterocycle group, all of which may have a substituent.

Examples of the metal complex-based electrochromic compound and the metal oxide-based electrochromic compound include inorganic electrochromic compounds, such as titanium oxide, vanadium oxide, tungsten oxide, indium oxide, iridium oxide, nickel oxide, and Prussian blue. The above-listed examples may be used alone or in combination.

Moreover, the electrochromic compound is preferably the organic electrochromic compound, and is more preferably the organic electrochromic compound born on conductive particles or semiconductive particles. The electrochromic layer including the organic electrochromic compound born on the conductive particles or the semiconductive particles is advantageous because electrons are efficiently injected to the organic electrochromic compound utilizing a large surface area of the conductive particles or the semiconductive particles and a resultant electrochromic device achieves high speed response compared to electrochromic devices known in the art. Moreover, another advantage is that a transparent film can be formed as a display layer using the conductive particles or the semiconductive particles, and a high coloring density of an electrochromic dye can be obtained. Furthermore, another advantage is that a plurality of types of organic electrochromic compounds can be born on the conductive particles or the semiconductive particles. The conductive particles or the semiconductive particles are not particularly limited and may be appropriately selected depending on the intended purpose. Examples of the conductive particles or the semiconductive particles include particles of metal oxide.

Examples of a material of the metal oxide include titanium oxide, zinc oxide, tin oxide, zirconium oxide, cerium oxide, yttrium oxide, boron oxide, magnesium oxide, strontium titanate, potassium titanate, barium titanate, calcium titanate, calcium oxide, ferrite, hafnium oxide, tungsten oxide, iron oxide, copper oxide, nickel oxide, cobalt oxide, barium oxide, strontium oxide, vanadium oxide, and metal oxides including as a main component, aminosilicic acid, calcium phosphate, aminosilicate, etc. The above-listed examples may be used alone or in combination.

Among the above-listed examples, in view of electrical properties, such as electric conductivity, and physical properties, such as optical characteristics, one selected from the group consisting of titanium oxide, zinc oxide, tin oxide, zirconium oxide, iron oxide, magnesium oxide, indium oxide, and tungsten oxide, or a mixture thereof is preferable because a color display having excellent coloring and decoloring response speed is realized, and titanium oxide is more preferable because a color display having more excellent coloring and decoloring response speed is realized.

Shapes of the conductive particles or the semiconductive particles are not particularly limited. The shapes are preferably shapes having large surface areas per unit volume (referred to as a specific surface area hereinafter) in order to efficiently bear the electrochromic compound.

When the particles are aggregates of nanoparticles, for example, the particles have a large specific surface area, an electrochromic compound is more efficiently born thereon, and as a result, a display contrast ratio of coloring and decoloring is excellent.

An average thickness of the electrochromic layer is not particularly limited and may be appropriately selected depending on the intended purpose. The average thickness is preferably 0.2 µm or greater but 5.0 µm or less. Use of the electrochromic layer having the average thickness within the above-mentioned preferable range is advantageous because a production cost can be reduced, coloring can be suppressed, and visibility is unlikely to be reduced, as well as easily achieving a desired coloring density.

The organic electrochromic layer born on the conductive particles or the semiconductive particles can be formed by vacuum film formation, but is preferably formed by applying a particle dispersion paste in view of productivity.

A formation method of the electrochromic layer is not particularly limited and may be appropriately selected depending on the intended purpose. Examples of the formation method include vacuum film formation methods and coating film formation methods.

Examples of the vacuum film formation methods include vacuum vapor deposition, sputtering, and ion plating.

Examples of the coating film formation methods include spin coating, casting, microgravure coating, gravure coating, bar coating, roll coating, wire bar coating, dip coating, slit coating, capillary coating, spray coating, nozzle coating, and various printing methods, such as gravure printing, screen printing, flexo printing, offset printing, reverse printing, and inkjet printing.

As a formation method of the organic electrochromic layer born on the conductive particles or the semiconductive particles, for example, the conductive particles or semiconductive particles having particle diameters of 5 nm or greater but 50 nm or less may be sintered on a surface of the electrode layer and the organic electrochromic compound having a polar group, such as phosphonic acid, a carboxyl group, and a silanol group, may be allowed to bear on surfaces of the sintered particles.

—Insulating Inorganic-Particle Layer—

The insulating inorganic-particle layer is a layer configured to separate the first electrode layer and the second electrode layer in order to electrically insulate between the first electrode layer and the second electrode layer.

A material of the insulating inorganic-particle layer is not particularly limited and may be appropriately selected depending on the intended purpose. The material is preferably an organic material, an inorganic material, or a composite thereof having high insulation, high durability, and excellent film formation properties.

Examples of a formation method of the insulating inorganic-particle layer include formation methods known in the art, such as sintering, extraction, foaming where a macromolecular polymer etc. is heated or degassed to foam, phase transferring where phase separation of a mixture of macromolecules is performed by controlling a good solvent and a poor solvent, and radial-ray irradiation where various radial rays are applied to form fine pores.

Examples of the sintering include a method where macromolecular particles or inorganic particles are added to a binder etc. to partially fuse the particles and pores formed between the particles are used.

Examples of the extraction include a method where a layer composed of an organic material or inorganic material soluble to a solvent and a binder insoluble to a solvent, etc., is formed, followed by dissolving the organic material or inorganic material with the solvent to form pores.

The insulating inorganic-particle layer is not particularly limited and may be appropriately selected depending on the intended purpose. Examples of the insulating inorganic-particle layer include a resin-mixed particle film formed of metal oxide particles (e.g., $SiO_2$ particles and $Al_2O_3$ particles) and a resin binder, a porous organic film (e.g., a polyurethane resin and a polyethylene resin), and an inorganic insulation material film formed on a porous film.

A number average particle diameter of primary particles of the metal oxide particles constituting the insulating inorganic-particle layer is preferably 5 nm or greater but 300 nm or less, and more preferably 10 nm or greater but 80 nm or less. The particles are preferably porous for permeation of an electrolyte solution, and in association with the particle diameters, metal oxide particles having large particle diameters are more preferable in order to increase a void ratio.

The insulating inorganic-particle layer is preferably used in combination with an inorganic film. As a material of the inorganic film, a material including ZnS is preferable. A film of ZnS can be formed at high speed by sputtering without damaging an electrochromic layer.

Examples of the material including ZnS as a main component include $ZnS-SiO_2$, $ZnS-SiC$, $ZnS-Si$, and $ZnS-Ge$. In order to excellently maintain crystallinity when the insulating inorganic-particle layer is formed, the ZnS content is preferably 50 mol % or greater but 90 mol % or less. Accordingly, $ZnS-SiO_2$ (molar ratio=8/2), $ZnS-SiO_2$ (molar ratio=7/3), ZnS, and $ZnS-ZnO-In_2O_3-Ga_2O_3$ (molar ratio=60/23/10/7) are more preferable.

Use of the above-mentioned material of the insulating inorganic-particle layer can achieve an excellent insulation effect with a thin film and can prevent low film strength and peeling of the film due to the formation of multilayers.

—Electrolyte—

The electrolyte is a solid electrolyte. The electrolyte is disposed between the first electrode layer and the second electrode layer and is held in a cured resin.

The electrolyte is not particularly limited and may be appropriately selected depending on the intended purpose, but inorganic particles configured to control an average thickness of the electrolyte are preferably mixed in the electrolyte.

After forming the insulating inorganic-particle layer in advance, moreover, the electrolyte is preferably applied, as a solution in which the electrolyte is mixed with the curable resin, onto the insulating inorganic-particle layer in a manner that the solution permeates the insulating inorganic-particle layer, followed by curing using light or heat. The electrolyte may be formed into a film by applying a solution in which the inorganic particles and the curable resin are mixed onto the electrochromic layer and curing the solution with light or heat.

In the case where the electrochromic layer is a layer including an electrochromic compound born on conductive or semiconductive nanoparticles, moreover, a solution in which the curable resin and the electrolyte are mixed is applied to permeate the electrochromic layer, followed by curing the solution with light or heat to form a film of the electrochromic layer.

Examples of the electrolyte solution include liquid electrolytes, such as ionic liquids, and solutions each obtained by dissolving a solid electrolyte in a solvent.

As the electrolyte, for example, inorganic ion salts (e.g., alkali metal salts and alkaline earth metal salts), quaternary ammonium salts, and supporting electrolytes of acids or alkalis can be used. Specific examples thereof include 1-ethyl-3-methylimidazolium salt, $LiClO_4$, $LiBF_4$, $LiAsF_6$, $LiCF_3SO_3$, $LiCF_3COO$, $KCl$, $NaClO_3$, $NaCl$, $NaBF_4$, $NaSCN$, $KBF_4$, $Mg(ClO_4)_2$, and $Mg(BF_4)_2$. The above-listed examples may be used alone or in combination.

Examples of the solvent include propylene carbonate, acetonitrile, γ-butyrolactone, ethylene carbonate, sulfolane, dioxolane, tetrahydrofuran, 2-methyltetrahydrofuran, dimethylsulfoxide, 1,2-dimethoxyethane, 1,2-ethoxymethoxyethane, polyethylene glycol, and alcohols. The above-listed examples may be used alone or in combination.

Examples of the curable resin include: photocurable resins, such as acrylic resins, urethane resins, epoxy resins, vinyl chloride resins, ethylene resins, melamine resins, and phenol resins; and heat-curable resins. Among the above-listed examples, a material having high compatibility to the electrolyte is preferable, and derivatives of ethylene glycol, such as polyethylene glycol and polypropylene glycol, are more preferable. As the curable resin, moreover, a photo-curable resin is preferable because an element can be produced at a low temperature within a short time period compared to a method where a thin film is formed by thermal polymerization or evaporation of a solvent.

Among the electrolytes where the above-mentioned materials are combined, a solid liquid between a matrix polymer including an oxyethylene chain or an oxypropylene chain and ionic liquid is particularly preferable because both hardness and high ionic conductivity are easily achieved.

The inorganic particles are not particularly limited as long as the inorganic particles can form a porous layer to retain an electrolyte and a curable resin. In view of stability of an electrochromic reaction and visibility, a material of the inorganic particles is preferably a material having high insulation properties, transparency, and durability. Specific examples of the material include oxides or sulfides of silicon, aluminium, titanium, zinc, tin, etc., or mixtures thereof.

A number average particle diameter of primary particles of the inorganic particles is not particularly limited and may be appropriately selected depending on the intended purpose. The number average particle diameter is preferably 10 nm or greater but 10 μm or less, and more preferably 10 nm or greater but 100 nm or less.

Second Embodiment

A layer structure of the electrochromic element according to a second embodiment includes the first substrate, the first electrode layer, the electrochromic layer, an insulating porous layer, and the second electrode layer having through holes, and a deterioration prevention layer in the order as mentioned, and includes an electrolyte between the first electrode layer and the deterioration prevention layer.

In the second embodiment, layers different from those in the first embodiment will be described below.

—Insulating Porous Layer—

The insulating porous layer has a function of retaining the electrolyte included in the loaded electrolyte solution, as well as separating the first electrode layer and the second electrode layer to electrically insulate between the first electrode layer and the second electrode layer having the through holes.

The insulating porous layer is not particularly limited and may be appropriately selected depending on the intended purpose. The insulating porous layer preferably includes insulating metal oxide particles.

Examples of the metal oxide particles include $SiO_2$ particles and $Al_2O_3$ particles. Among the above-listed examples, $SiO_2$ particles are preferable. Use of $SiO_2$ particles as the insulating metal oxide particles is advantageous because nano particles whose number average particle diameter of primary particles is 5 nm or greater but 500 nm or less and a dispersion coating liquid of the nanoparticles are obtained at low cost. Examples of the insulating porous layer include a polymer-mixed particle film including the metal oxide particles and a polymer binder, a porous organic film, and an inorganic insulating material film formed into a porous film.

Examples of the porous organic film include a polyurethane resin and a polyethylene resin.

A material of the insulating porous layer is not particularly limited and may be appropriately selected depending on the intended purpose. An organic material, inorganic material, or composite thereof having high insulation properties and durability and excellent film formability is preferably used.

An average thickness of the insulating porous layer is not particularly limited and may be appropriately selected depending on the intended purpose. The average thickness is preferably 50 nm or greater but 10 μm or less.

Average roughness (Ra) of the insulating porous layer depends on an average thickness of the second electrode layer having the through holes. For example, the average roughness (Ra) is preferably less than 100 nm, when an average thickness of the second electrode layer having the through holes is 100 nm. Use of the insulating porous layer having the average roughness of less than 100 nm is advantageous because surface resistance of the second electrode layer having the through holes is not significantly impaired, which is unlikely to cause display failures.

The insulating inorganic-particle layer is preferably used in combination with an inorganic film. As a material of the inorganic film, a material including ZnS as a main component is preferable. A film of ZnS can be formed at high speed by sputtering without damaging an electrochromic layer.

Examples of the material including ZnS as a main component include ZnS—$SiO_2$, ZnS—SiC, ZnS—Si, and ZnS—Ge. In order to excellently maintain crystallinity when the insulating inorganic-particle layer is formed, the ZnS content is preferably 50 mol % or greater but 90 mol % or less. Accordingly, ZnS—SiO$_2$ (molar ratio=8/2), ZnS—SiO$_2$ (molar ratio=7/3), ZnS, and ZnS—ZnO—In$_2$O$_3$—Ga$_2$O$_3$ (molar ratio=60/23/10/7) are more preferable.

Use of the above-mentioned material of the insulating inorganic-particle layer can achieve an excellent insulation effect with a thin film and can prevent low film strength and peeling of the film due to the formation of multilayers.

—Second Electrode Layer Having Through Holes—

The second electrode layer having the through holes is not particularly limited and may be appropriately selected depending on the intended purpose, as long as the second electrode layer is disposed to face the first electrode layer and has through holes therein.

Compared to the electrode layer, the second electrode layer having the through holes is identical other than the through holes formed along a thickness direction of the electrode. As a material of the second electrode layer having the through holes, the same materials to the materials of the first electrode layer and the second electrode layer can be used.

The through holes are not particularly limited and may be appropriately selected depending on the intended purpose. The through holes are preferably a large number of fine through holes.

Diameters of the through holes are not particularly limited and may be appropriately selected depending on the intended purpose. The diameters are preferably 10 nm (0.01 µm) or greater but 100 µm or less. When the diameters of the through holes are within the preferable range, advantageously, occurrences of a problem that permeation of electrolyte ions becomes poor can be reduced and occurrences of a problem where the size of the through holes becomes a level that can be visually observed from the above of the through holes (the size of one pixel electrode level in a typical display) can be reduced.

A pore area rate (hole density) of the through holes disposed in the second electrode layer having the through holes relative to a surface area of the second electrode layer having the through holes is not particularly limited and may be appropriately selected depending on the intended purpose. The hole density is preferably 0.01% or greater but 40% or less. The hole density within the preferable range is advantageous, because permeation of the electrolyte is excellent, a problem is unlikely to occur during the driving of coloring and decoloring, a surface resistance of the second electrode does not become excessively large, and chromic defects that may be caused by a large area of a region where the second electrode layer having the through holes is not present is unlikely to occur.

—Deterioration Prevention Layer—

Use of the deterioration prevention layer can expect an effect of stabilizing an electrochemical reaction because of a reverse reaction of the electrochromic layer performed, and an effect of reducing a potential difference required for an electrochromic reaction.

The deterioration prevention layer is not particularly limited and may be appropriately selected depending on the intended purpose. In the case where the electrochromic layer colors through reduction, it is preferable that an oxidization reaction occur in the deterioration prevention layer.

A material of the deterioration prevention layer is not particularly limited and may be appropriately selected depending on the intended purpose. Since the material can be regarded as an (almost color-unchanging) electrochromic material that has a small change of a light absorption band in a visible range as a result of redox reactions, the electrochromic material similar to the electrochromic material of the electrochromic layer can be used.

A formation method of the deterioration prevention layer is not particularly limited and may be appropriately selected depending on the intended purpose. Examples of the formation method include vacuum film formation methods and coating film formation methods.

Examples of the vacuum film formation methods include vacuum vapor deposition, sputtering, and ion plating.

Examples of the coating film formation methods include spin coating, casting, microgravure coating, gravure coating, bar coating, roll coating, wire bar coating, dip coating, slit coating, capillary coating, spray coating, nozzle coating, and various printing methods, such as gravure printing, screen printing, flexo printing, offset printing, reverse printing, and inkjet printing.

—Protective Layer—

The protective layer is formed to physically and chemically protect side surfaces of the electrochromic device.

For example, the protective layer can be formed by applying an ultraviolet ray-curable or heat-curable insulating resin etc. to cover at least either of side surfaces or a top surface, followed by curing. Moreover, the protective layer is more preferably a laminate protective layer of a curable resin and an inorganic material. Barrier properties against oxygen or water can be improved when the protective layer has a laminate structure with an inorganic material.

The inorganic material is preferably a material having high insulation, transparency, and durability. Examples of the inorganic material include oxides or sulfides of silicon, aluminium, titanium, zinc, tin, etc., or mixtures thereof. Films of the above-listed materials can be easily formed by a vacuum film formation process, such as sputtering and vapor deposition.

An average thickness of the protective layer is not particularly limited and may be appropriately selected depending on the intended purpose. The average thickness is preferably 0.5 µm or greater but 10 µm or less.

<Frame>

The frame holds a periphery of the electrochromic element and includes a connecting member capable of electrically connecting to the electrode pad.

The frame is not particularly limited and may be appropriately selected depending on the intended purpose. Examples of the frame include frames of spectacles.

<<Connecting Member>>

The connecting member is not particularly limited and may be appropriately selected depending on the intended purpose. The connecting member is preferably an elastic material that can press against the electrode pad.

The elastic material is not particularly limited and may be appropriately selected depending on the intended purpose, as long as the elastic material can electrically connect to the electrode pad. The elastic material is preferably a flat spring. Use of the flat spring as the elastic material is advantageous because electrical connection having more excellent durability can be obtained.

<<Other Members>>

The above-mentioned other members are not particularly limited and may be appropriately selected depending on the intended purpose. Examples thereof include a power source and a switch.

<Use>

For example, the electrochromic device is suitably used for a pair of electrochromic light-adjusting spectacles, antiglare mirror, and light-adjusting glass. Among the above-listed examples, a pair of electrochromic light-adjusting spectacles are preferable.

FIG. 1 is a schematic view illustrating one example of an electrochromic device of the present disclosure. As illustrated in FIG. 1, an electrochromic device 100 serving as electrochromic light-adjusting spectacles includes an electrochromic element 10, a frame 30, a switch 53, and a power source 54. The electrochromic element 10 is obtained by processing the electrochromic device of the present disclosure into the desired shape.

A pair of the electrochromic elements 10 are inserted into the frame 30. The switch 53 and the power source 54 are disposed on the frame 30. The power source 54 is electrically connected to the first electrode layer and the second electrode layer via the connecting members and the electrode pads through wiring (not illustrated) via the switch 53.

One state can be selected among a state where positive voltage is applied between the first electrode layer and the second electrode layer, a state where negative voltage is applied between the first electrode layer and the second electrode layer, and a state where no voltage is applied, by switching with the switch 53.

As the switch 53, for example, any switch, such as a slide switch and a push switch, can be used as long as the switch is a switch capable of switching among at least the above-mentioned 3 states.

As the power source 54, for example, an arbitrary DC power source, such as a button cell and a solar cell, can be used. The power source 54 is capable of applying the voltage of about positive or negative several voltages (V) between the first electrode layer and the second electrode layer.

For example, a pair of the electrochromic elements 10 color in the predetermined color, when positive voltage is applied between the first electrode layer and the second electrode layer. Moreover, the pair of the electrochromic elements 10 decolor and become transparent, when negative voltage is applied between the first electrode layer and the second electrode layer.

However, there is a case where, depending on properties of a material used for the electrochromic layer, the electrochromic elements color when negative voltage is applied between the first electrode layer and the second electrode layer, and the electrochromic elements decolor and become transparent when positive voltage is applied between the first electrode layer and the second electrode layer. Once the electrochromic element colors, the color remains without applying voltage between the first electrode layer and the second electrode layer.

Figure 2A:
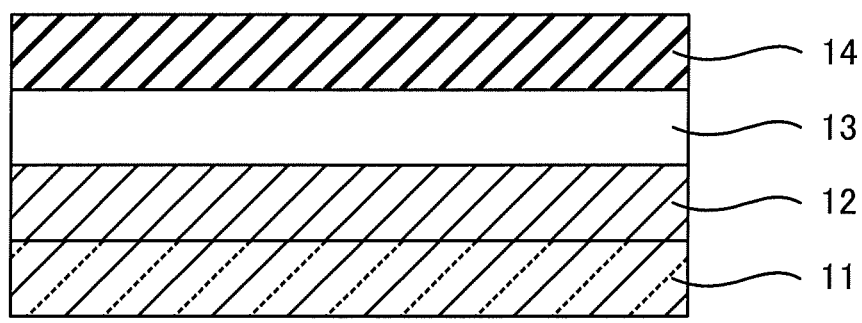
FIG. 2A is a schematic view illustrating a first laminate constituting part of layers of an electrochromic element used in the electrochromic device of FIG. 1.

FIG. 2A is a schematic view illustrating a first laminate constituting part of layers of an electrochromic element used in the electrochromic device of FIG. 1.

As illustrated in FIG. 2A, the first laminate includes a first electrode layer 12, an electrochromic layer 13, and an insulating inorganic-particle layer 14 formed on a first substrate 11 in the order as mentioned.

Figure 2B:
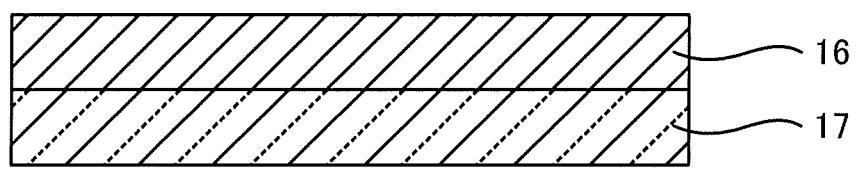
FIG. 2B is a schematic view illustrating a second laminate constituting another part of layers of the electrochromic element used in the electrochromic device of FIG. 1.

FIG. 2B is a schematic view illustrating a second laminate constituting another part of layers of the electrochromic element used in the electrochromic device of FIG. 1.

As illustrated in FIG. 2B, the second laminate includes a second electrode layer 16 formed on a second substrate 17.

Figure 2C:
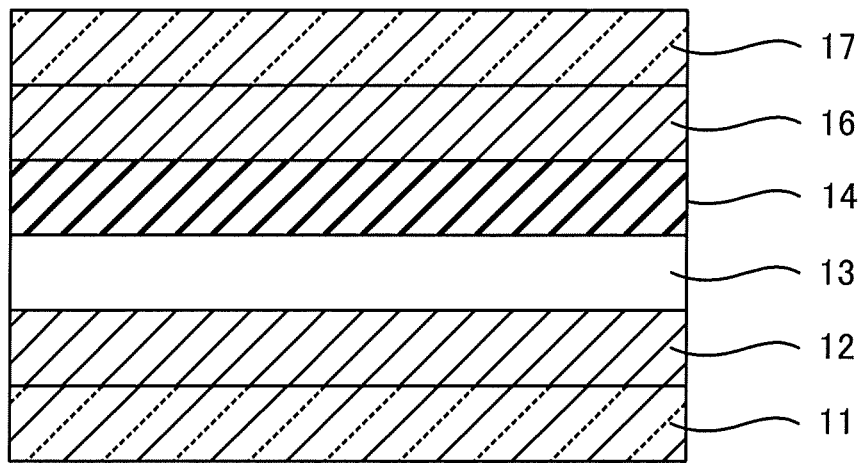
FIG. 2C is a schematic view illustrating a state where the first laminate illustrated in FIG. 2A and the second laminate illustrated in FIG. 2B are assembled together.

FIG. 2C is a schematic view illustrating a state where the first laminate illustrated in FIG. 2A and the second laminate illustrated in FIG. 2B are assembled together.

As illustrated in FIG. 2C, a layer structure of the electrochromic element includes the insulating inorganic-particle layer 14 illustrated in FIG. 2A and the second electrode layer 16 illustrated in FIG. 2B disposed to face each other, and an electrolyte that is not illustrated is inserted between the first electrode layer 12 and the second electrode layer 16.

Figure 2D:
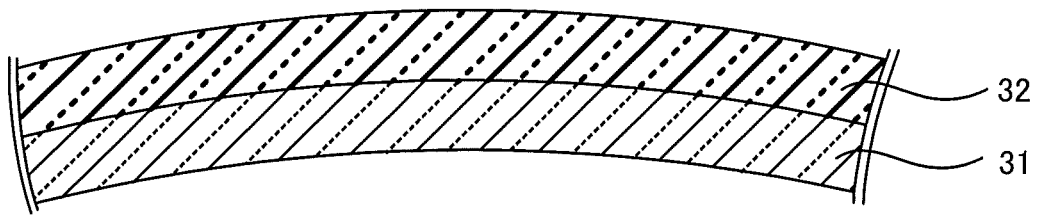
FIG. 2D is a schematic view illustrating a state where the electrochromic element of FIG. 2C was shaped through thermoforming.

FIG. 2D is a schematic view illustrating a state where the electrochromic element of FIG. 2C is shaped through thermoforming. Specifically, FIG. 2D illustrates an electrochromic element, which is formed by bonding a first laminate 32 and a second laminate 31 via an electrolyte and performing thermoforming. In the first laminate 32, the first electrode layer 12, the electrochromic layer 13, and the insulating inorganic-particle layer 14 are laminated on the first substrate 11 in the order as mentioned. In the second laminate 31, the second electrode layer 16 is formed on the second substrate 17.

Figure 2E:
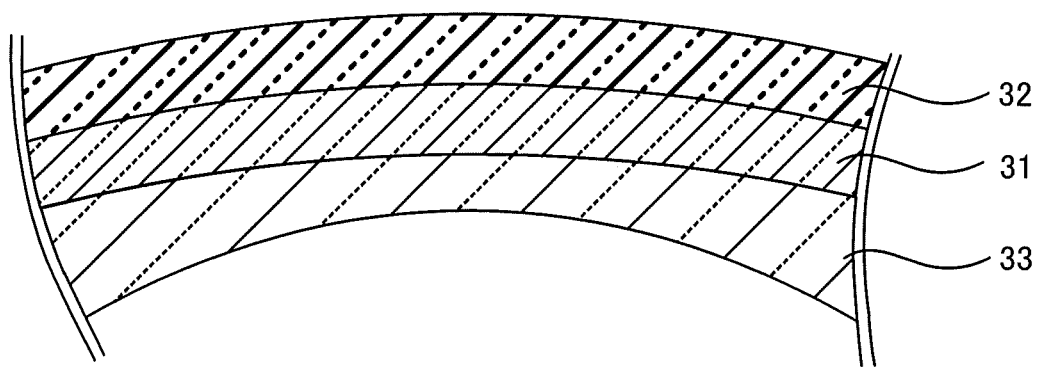
FIG. 2E is a schematic view illustrating a state where a resin layer is formed on the electrochromic element of FIG. 2D.

As illustrated in FIG. 2D, the electrochromic element used as a light-adjusting lens in the electrochromic device of the present disclosure is processed into a desired shape by thermoforming and a resin is additionally formed on a surface of the second laminate 31 that is the side of the second substrate 17 to thicken the substrate. As illustrated in FIG. 2E, a desired curvature can be formed by machining the thickened substrate 33, and therefore lens processing (lens power processing etc.) according to the conditions unique to a user can be realized, and a light-adjusting lens suitable for the user can be obtained. According to the method mentioned above, it is not necessary to prepare a mold or a member for each shape of a product, and it is easy to produce a large number of products with small volumes.

Figure 3:
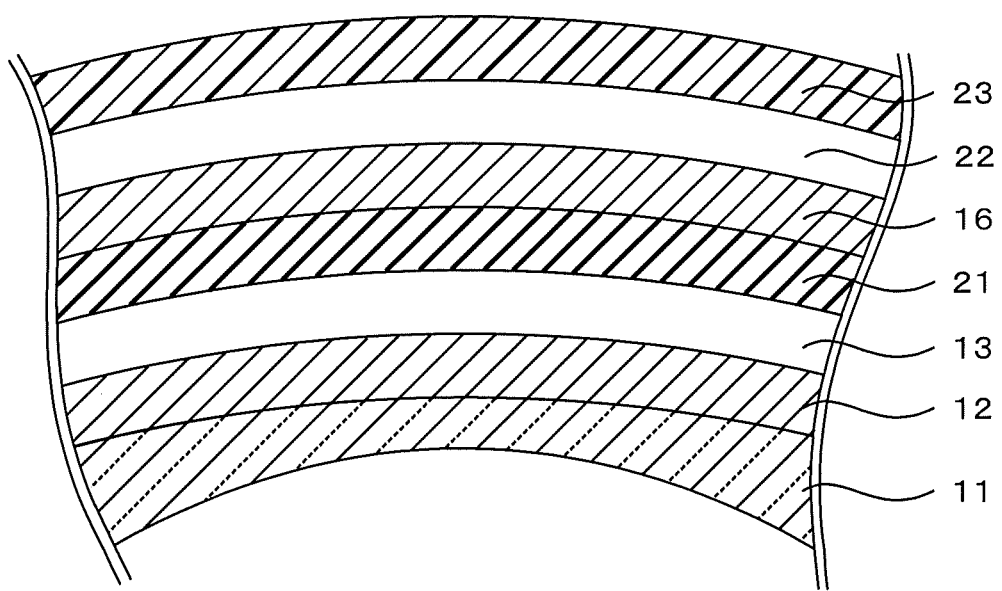
FIG. 3 is a schematic view illustrating another example of a layer structure of the electrochromic element used in the electrochromic device of FIG. 1.

FIG. 3 is a schematic view illustrating another example of a layer structure of the electrochromic element used in the electrochromic device of FIG. 1.

As illustrated in FIG. 3, the electrochromic element 10 includes the first electrode layer 12, the electrochromic layer 13, the insulating porous layer 21, the second electrode layer 16, the deterioration prevention layer 22, and the protective layer 23 are laminated in the order as mentioned on the substrate 11 serving as a lens.

The insulating porous layer 21 is disposed to insulate between the first electrode layer 12 and the second electrode layer 16 and is filled with an electrolyte that is not illustrated. A large number of pores piercing through the second electrode layer 16 along a thickness direction of the second electrode layer 16 are formed.

A large number of pores piercing through the deterioration prevention layer 22 along a thickness direction of the deterioration prevention layer 22 are formed. The deterioration prevention layer 22 includes semiconductor metal oxide particles and is filled with an electrolyte that is not illustrated.

When the structure illustrated in FIG. 3 is used, it is not necessary to perform a process where 2 bases are bonded together and curved as with the structure illustrated in FIG. 2D, and each layer can be formed on a lens in advance. Therefore, a production process of the electrochromic element can be simplified and an element having less optical distortion can be obtained.

Figure 4:
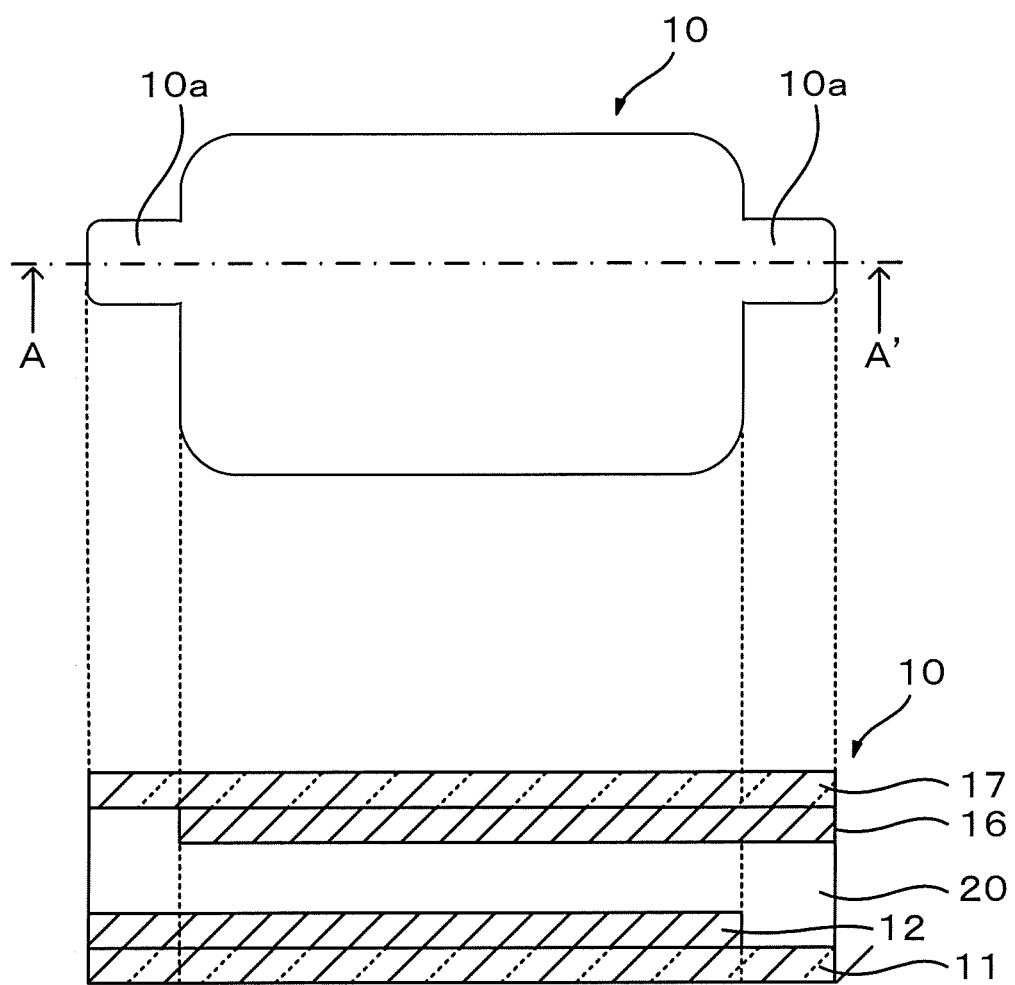
FIG. 4 is a schematic view illustrating one example of a front surface and cross-section of the electrochromic element used in the electrochromic device of FIG. 1.

FIG. 4 is a schematic view illustrating one example of a front surface and cross-section of an electrochromic element used in the electrochromic device of FIG. 1. Note that, the bottom part of FIG. 4 is a schematic view of A-A' cross-section of the upper part of FIG. 4.

As illustrated in the front view of the upper part of FIG. 4, 2 protrusions 10a are disposed at the both sides of the electrochromic element 10. As illustrated in the cross-sectional view of the bottom part of FIG. 4, the first electrode layer 12 is exposed at the A side of the edge face of the protrusion 10a, and the second electrode layer 16 is exposed at the A' side of the edge of the protrusion 10a. After applying a conductive adhesive to the edges of the protrusions 10a, a copper foil is wound around each protrusion 10a to form an electrode pad 10b as illustrated in FIG. 6.

Figure 5B:
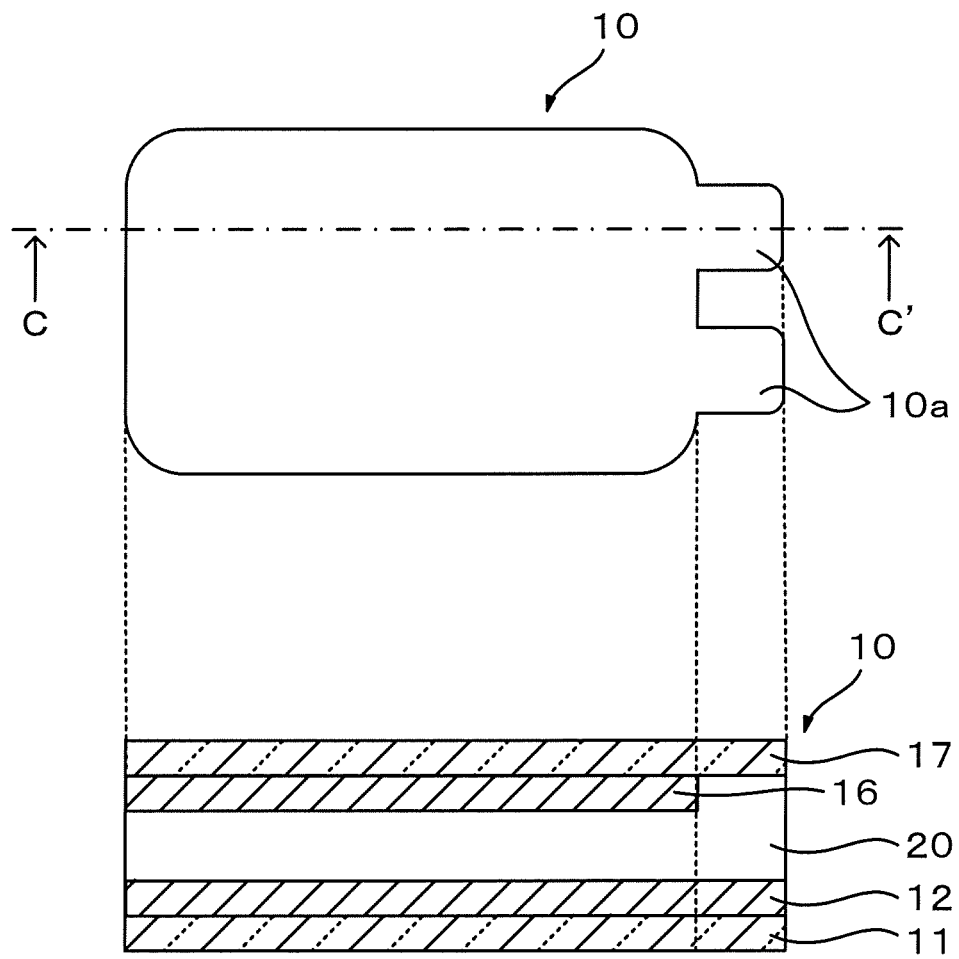
FIG. 5B is a schematic view illustrating another example of a front surface and cross-section of the electrochromic element used in the electrochromic device of FIG. 1.

FIGS. 5A and 5B are schematic views each illustrating another example of a front surface and cross-section of the electrochromic element used in the electrochromic device of FIG. 1, and are examples where protrusions 10a are disposed at different positions from the positions in FIG. 4.

As illustrated in the upper part of FIG. 5A, protrusions 10a are disposed next to each other at one side of the electrochromic element 10. As illustrated in the bottom part of FIG. 5A, the second electrode layer 16 is exposed at the edge face of the protrusion 10a on the B-B' cross-section. As illustrated in the bottom part of FIG. 5B, moreover, the first electrode layer 12 is exposed at the edge face of the protrusion 10a on the C-C' cross-section. Electrode pads 10b may be formed on these protrusions 10a.

Figure 6:
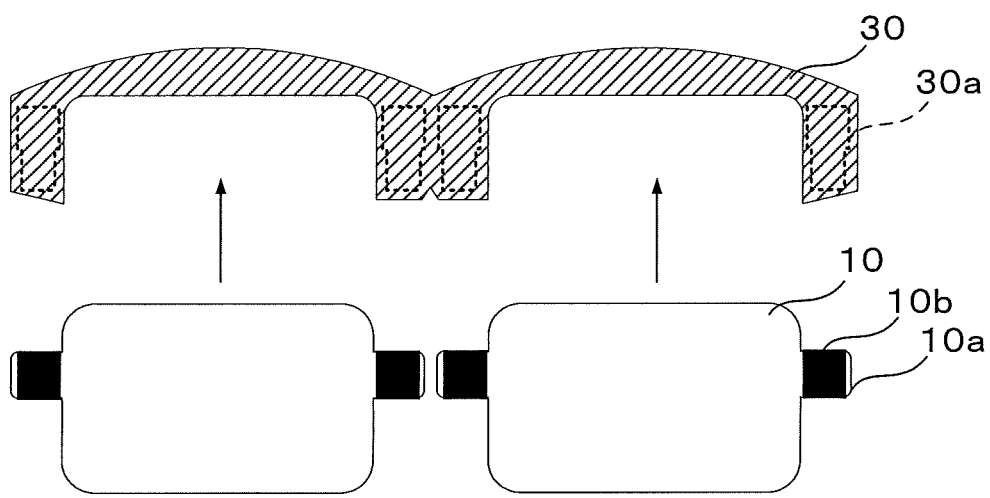
FIG. 6 is an explanatory view illustrating connection between electrode pads disposed in the electrochromic elements of FIG. 4 and connecting members disposed on a frame.

FIG. 6 is an explanatory view illustrating connection between electrode pads disposed on the electrochromic element of FIG. 4 and connecting members disposed on a frame.

As illustrated in FIG. 6, the electrode pads 10b disposed on the protrusions 10a of the electrochromic element 10 and the connecting members 30a disposed on the frame 30 are fitted together in the direction of the arrows in FIG. 6 to electrically connect. Note that, the connecting members 30a are connected to a power source not illustrated in FIG. 6.

Figure 7A:
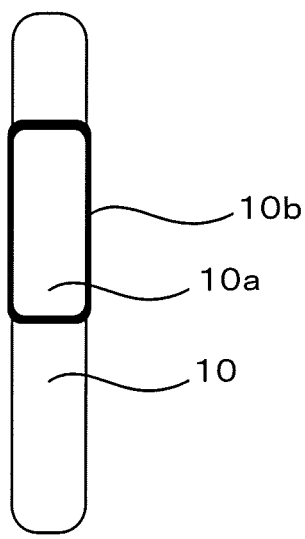
FIG. 7A is a schematic view illustrating a cross-section of a state where an electrode pad is disposed in the electrochromic element of FIG. 4.
Figure 7B:
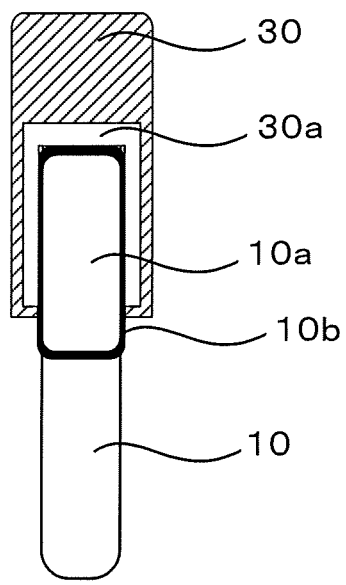
FIG. 7B is a schematic view illustrating a cross-section of a state where a connecting member is connected to the electrode pad of the electrochromic element of FIG. 7A.

FIG. 7A is a schematic view of a cross-section illustrating a state where an electrode pad is disposed in the electrochromic element of FIG. 4. FIG. 7B is a schematic view of a cross-section illustrating a state where a connecting member is connected to the electrode pad of the electrochromic element of FIG. 7A.

Figure 8:
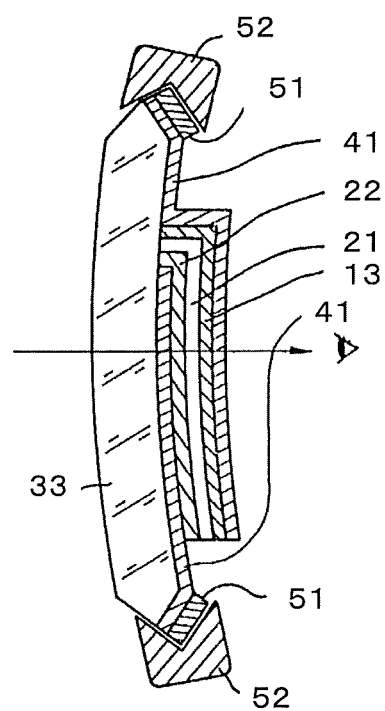
FIG. 8 is a schematic view illustrating a cross-section of the electrochromic element of Comparative Example 1.

As illustrated in FIG. 7B, the electrode pad 10b is fitted with the connecting member 30a disposed on the frame 30 to electrically connect the electrode pad 10b to the connecting member 30a. As a result, a contact area becomes large and electrical connection having excellent durability can be obtained compared to an exposed electrode formed on an inclined plane part of the lens edge according to the art as illustrated in FIG. 8.

EXAMPLES

The present disclosure will be described in more detail by ways of the following Examples, but the present disclosure should not be construed as being limited to these Examples.

Example 1

<Production of Electrochromic Element>
—Production of First Substrate—
As a first substrate, an oval polycarbonate substrate having a major axis length of 80 mm, a minor axis length of 55 mm, and an average thickness of 0.5 mm was produced.
—Formation of First Electrode Layer—
As a first electrode layer, an ITO film having an average thickness of 100 nm was formed on the first substrate by sputtering.
—Formation of Electrochromic Layer—
A titanium oxide nanoparticle dispersion liquid (SP-210, available from Showa Denko Ceramics Co., Ltd., average particle diameter: 20 nm) was applied onto a surface of the obtained first electrode layer by spin coating, followed by annealing for 5 minutes at 120° C., to thereby form a titanium oxide particle film (nano structure semiconductor material) having an average thickness of 1.0 μm.

Next, a 2,2,3,3,-tetrafluoropropanol solution including 1.5% by mass of a dipyridine-based compound represented by Structural Formula (1) below as an electrochromic compound was applied by spin coating, followed by annealing for 10 minutes at 120° C., to thereby form an electrochromic layer on which the titanium oxide particles were born.

[Structural Formula (1)]

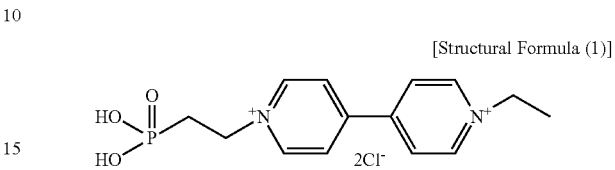

—Formation of Insulating Inorganic-Particle Layer—
A $SiO_2$ particle dispersion liquid (concentration of silica solid content: 24.8% by mass, polyvinyl alcohol: 1.2% by mass, and water: 74.0% by mass) where primary particles of the $SiO_2$ particles had a number average particle diameter of 20 nm was applied onto the obtained electrochromic layer by spin coating, to thereby form an insulating inorganic-particle layer having an average thickness of 2 μm.
—Production of Second Substrate—
As a second substrate, a polycarbonate substrate identical to the first substrate was produced.
—Formation of Second Electrode Layer—
As a second electrode layer, an ITO film having an average thickness of 100 nm was formed on the second substrate by sputtering.
—Formation of Electrolyte—
Onto a surface of the insulating inorganic-particle layer, a solution in which polyethylene diacrylate, a photopolymerization initiator (IRGACURE (registered trademark) 184, available from BASF), an electrolyte (1-ethyl-3-methylimidazolium salt) were mixed at 100:5:40 (mass ratio) was applied, and the surface of the insulating inorganic-particle layer was bonded to a surface of the substrate to which the second electrode layer had been formed, followed by UV curing, to thereby form an electrolyte between the first electrode layer and the second electrode layer.
—Formation of Protective Layer—
An ultraviolet ray-curable adhesive (KAYARAD R-604, available from Nippon Kayaku Co., Ltd.) was dripped on side surfaces of a bonded body where the insulating inorganic-particle layer and the second electrode layer were bonded together, and the ultraviolet ray-curable adhesive was cured by irradiation of ultraviolet rays, to thereby form a protective layer having an average thickness of 3 μm.

As described above, an electrochromic element before thermoforming illustrated in FIG. 2C was produced.
<Production of Electrochromic Device>
The obtained electrochromic element before thermoforming was subjected to lens shape processing to fit with a shape of a desired frame, to form protrusions each having a width of 3 mm and a length of 5 mm on both sides of the electrochromic element along a major axis direction. Silver paste (DOTITE, available from FUJIKURA KASEI CO., LTD.) serving as a conductive adhesive was applied to each of the protrusions using a brush or a toothpick, a copper foil was wound around each of the protrusions, and then the silver paste was cured for 15 minutes at 60° C. to electrically connect an edge of the first electrode layer or the second electrode layer exposed by scraping the protective layer through the lens shape processing to the copper foil with the silver paste, to thereby produce electrode pads. Next, the electrochromic element was formed into a lens by thermoforming, and then the electrochromic element was mounted in a rim of a frame as illustrated in FIG. 7B. As a result, the electrode pads and connecting members disposed on the frame were electrically connected to thereby produce Electrochromic Device 1.

Voltage of −3.5 V was applied between the first electrode layer and the second electrode layer of Electrochromic Device 1 obtained in a manner that the first electrode layer was to be a negative electrode. As a result, Electrochromic Device 1 colored in magenta derived from the electrochromic compound represented by Structural Formula (1) above, and light adjustment of Electrochromic Device 1 was achieved.

<Evaluation of Durability of Electrical Connection>

The operation of opening temples of Electrochromic Device 1 and the operation of closing the temples were repetitively performed by rotating hinges, and whether light adjustment could be performed was confirmed after performing the operations 100 times, after 1,000 times, and after 2,000 times. As a result, light adjustment could be performed after 100 times and 1,000 times without any problem, but light adjustment could not be performed after 2,000 times due to a conduction failure.

Example 2

<Production of Electrochromic Element>
—Production of First Substrate—

As a first substrate, a circular urethane lens having a diameter of 75 mm and an average thickness of 2 mm was prepared.

—Formation of First Electrode Layer—

As a first electrode layer, an ITO film having an average thickness of 100 nm was formed on the obtained lens by sputtering.

—Formation of Electrochromic Layer—

A titanium oxide nanoparticle dispersion liquid (SP-210, available from Showa Denko Ceramics Co., Ltd., average particle diameter: 20 nm) was applied onto a surface of the obtained electrode layer by spin coating, followed by annealing for 5 minutes at 120° C., to thereby form a titanium oxide particle film (nano structure semiconductor material) having an average thickness of 1.0 μm.

A 2,2,3,3-tetrafluoropropanol solution including 1.5% by mass of a dipyridine-based compound represented by Structural Formula (1) above as an electrochromic compound was applied by spin coating, followed by annealing for 10 minutes at 120° C. to allow the titanium oxide particle film to bear (adsorb) the electrochromic compound to thereby form an electrochromic layer.

Formation of Insulating Porous Layer and Second Electrode Layer Having Through Holes—

A $SiO_2$ particle dispersion liquid (concentration of silica solid content: 24.8% by mass, polyvinyl alcohol: 1.2% by mass, and water: 74.0% by mass) where primary particles of the $SiO_2$ particles had a number average particle diameter of 20 nm was applied onto the obtained electrochromic layer by spin coating, to thereby form an insulating inorganic-particle layer having an average thickness of 2 μm.

Moreover, a $SiO_2$ particle dispersion liquid (concentration of silica solid content: 1% by mass and 2-propanol: 99% by mass) where primary particles of the $SiO_2$ particles had a number average particle diameter of 450 nm was applied by spin coating to form a mask for forming through holes. On the mask for forming through holes, a $ZnS$—$SiO_2$ (molar ratio=8/2) layer having an average thickness of 40 nm was formed on the mask for forming through holes by sputtering. On the $ZnS$—$SiO_2$ (molar ratio=8/2) layer, moreover, an ITO film having an average thickness of 100 nm was formed as the second electrode layer by sputtering.

Thereafter, ultrasonic-wave irradiation was performed in 2-propanol to remove the $SiO_2$ particles where primary particles of the $SiO_2$ particles had the number average particle diameter of 450 nm, to thereby form a $ZnS$—$SiO_2$ (molar ratio=8/2) layer having a large number of pores piecing through in the thickness direction and the second electrode layer having through holes.

—Formation of Deterioration Prevention Layer—

A titanium oxide nanoparticle dispersion liquid (SP-210, available from Showa Denko Ceramics Co., Ltd., average particle diameter: 20 nm) was applied onto a surface of the obtained second electrode layer having through holes by spin coating, followed by annealing for 5 minutes at 120° C., to thereby form a titanium oxide particle film (nano structure semiconductor material) having an average thickness of 1.0 μm.

Tetrabutylammonium perchlorate serving as an electrolyte, and dimethyl sulfoxide and polyethylene glycol serving as solvents were mixed at 12:54:60 (mass ratio) to thereby prepare an electrolyte solution. The electrochromic element in which up to the deterioration prevention layer had been formed was dipped in the electrolyte solution, followed by drying on a hot plate of 120° C., to thereby form an electrolyte.

—Formation of Protective Layer—

An ultraviolet ray-curable adhesive (SD-17, available from DIC Corporation) was applied onto the obtained deterioration prevention layer by spin coating, followed by ultraviolet-light irradiation to cure the adhesive, to thereby form a protective layer having an average thickness of 3 μm.

As described above, Electrochromic Element 2 was produced.

<Production of Electrochromic Device>

Lens shape processing was performed, electrode pads were formed on the lenses, and the lenses were mounted in a frame to produce Electrochromic Device 2 in the same manner as in Example 1, except that Electrochromic Element 1 was replaced with Electrochromic Element 2. An evaluation was performed in the same manner as in Example 1.

As a result, it was confirmed that light adjustment could be performed without any problem after 100 times and after 1,000 times similarly to Example 1, but a conduction failure occurred when confirmed after 2,000 times.

Example 3

An electrochromic device of Example 3 was produced in the same manner as in Example 1, except that flat springs were used as connecting members each of which nipped the electrode pad, and an evaluation was performed in the same manner as in Example 1.

As a result, light adjustment could be performed without any problem even after 2,000 times. A reason thereof was assumed that the flat spring was in contact with the copper foil of the electrode pad even when the electrochromic element was moved inside the rim of the frame because the flat spring nipped the electrode pad and hence electrical connection could be securely obtained.

Comparative Example 1

An electrochromic device of Comparative Example 1 was produced in the same manner as in Example 1, except that, as illustrated in FIG. 8, the periphery of the electrochromic element 33 was subjected to lens edging, and the electrode layer 41 exposed on the inclined surface of the lens edge and a connecting member 52 of the frame were electrically connected via anisotropic conductive rubber 51. An evaluation was performed in the same manner as in Example 1.

As a result, a conduction failure occurred when confirmed after 100 times.

For example, embodiments of the present disclosure are as follows.

<1> An electrochromic device including:
an electrochromic element including a protrusion on a periphery of the electrochromic element; and
a frame holding the electrochromic element,
wherein the protrusion includes an electrode pad, and
the frame includes a connecting member configured to electrically connect to the electrode pad.
<2> The electrochromic device according to <1>,
wherein the electrochromic element includes a first substrate, a first electrode layer, an electrochromic layer, an insulating inorganic-particle layer, a second electrode layer, and a second substrate in the order as mentioned, and
an electrolyte is disposed between first electrode layer and the second electrode layer.
<3> The electrochromic device according to <1>,
wherein the electrochromic element includes a first substrate, a first electrode layer, an electrochromic layer, an insulating porous layer, a second electrode layer having through holes, and a deterioration prevention layer in the order as mentioned, and
an electrolyte is disposed between the first electrode layer and the deterioration prevention layer.
<4> The electrochromic device according to any one of <1> to <3>,
wherein the connecting member is an elastic material that can press against the electrode pad.
<5> The electrochromic device according to <4>,
wherein the elastic material is a flat spring.
<6> The electrochromic device according to any one of <2> to <5>,
wherein an edge of the first electrode layer or the second electrode layer is electrically connected to the electrode pad with a conductive adhesive.
<7> The electrochromic device according to any one of <1> to <6>,
wherein the electrode pad is a metal foil.
<8> The electrochromic device according to <7>,
wherein the metal foil is wound around the protrusion.
<9> The electrochromic device according to <7> or <8>,
wherein the metal foil is a copper foil.
<10> The electrochromic device according to any one of <6> to <9>,
wherein the conductive adhesive is silver paste.
<11> The electrochromic device according to any one of <2> to <10>,
wherein the first electrode layer, or the second electrode layer, or both of the first electrode layer and the second electrode layer is tin-doped indium oxide.
<12> The electrochromic device according to any one of <2> to <11>,
wherein the electrochromic layer includes an organic electrochromic compound on which conductive particles or semiconductive particles are born.
<13> The electrochromic device according to <12>,
wherein the conductive particles or the semiconductive particles are metal oxide.
<14> The electrochromic device according to <13>,
wherein the metal oxide is titanium oxide.
<15> The electrochromic device according to any one of <2> to <14>,
wherein an average thickness of the electrochromic layer is 0.2 μm or greater but 5.0 μm or less.
<16> The electrochromic device according to any one of <2> to <15>,
wherein the electrochromic element further includes a protective layer.
<17> The electrochromic device according to <16>,
wherein an average thickness of the protective layer is 0.5 μm or greater but 10 μm or less.
<18> The electrochromic device according to any one of <1> to <17>,
wherein the electrochromic element is in the shape of a lens.
<19> The electrochromic device according to any one of <2> to <18>,
wherein the first substrate is a lens.
<20> The electrochromic device according to any one of <1> to <19>,
wherein the electrochromic device is a pair of electrochromic light-adjusting spectacles.

The electrochromic device according to any one of <1> to <20> can solve the above-described various problems existing in the art and can achieve the object of the present disclosure.

What is claimed is:
1. An electrochromic device comprising:
an electrochromic element including a protrusion on a periphery of the electrochromic element; and
a frame holding the electrochromic element,
wherein the protrusion includes an electrode pad,
the frame includes a connecting member configured to electrically connect to the electrode pad, and
wherein at least one of the following conditions is met:
the electrochromic element includes a first substrate, a first electrode layer, an electrochromic layer, an insulating inorganic-particle layer, a second electrode layer, and a second substrate in the order as mentioned, and an electrolyte is disposed between first electrode layer and the second electrode layer,
the electrochromic element includes a first substrate, a first electrode layer, an electrochromic layer, an insulating porous layer, a second electrode layer having through holes, and a deterioration prevention layer in the order as mentioned, and an electrolyte is disposed between the first electrode layer and the deterioration prevention layer, or
the connecting member is an elastic material that can press against the electrode pad.
2. The electrochromic device according to claim 1,
wherein the electrochromic element includes a first substrate, a first electrode layer, an electrochromic layer, an insulating inorganic-particle layer, a second electrode layer, and a second substrate in the order as mentioned, and
an electrolyte is disposed between first electrode layer and the second electrode layer.
3. The electrochromic device according to claim 2,
wherein an edge of the first electrode layer or the second electrode layer is electrically connected to the electrode pad with a conductive adhesive.
4. The electrochromic device according to claim 2,
wherein the first substrate is a lens.

5. The electrochromic device according to claim 1,
wherein the electrochromic element includes a first substrate, a first electrode layer, an electrochromic layer, an insulating porous layer, a second electrode layer having through holes, and a deterioration prevention layer in the order as mentioned, and
an electrolyte is disposed between the first electrode layer and the deterioration prevention layer.

6. The electrochromic device according to claim 1,
wherein the connecting member is an elastic material that can press against the electrode pad.

7. The electrochromic device according to claim 6,
wherein the elastic material is a flat spring.

8. The electrochromic device according to claim 1,
wherein the electrode pad is a metal foil.

9. The electrochromic device according to claim 1,
wherein the electrochromic element is in the shape of a lens.

10. The electrochromic device according to claim 1,
wherein the electrochromic device is a pair of electrochromic light-adjusting spectacles.

* * * * *